United States Patent [19]
Winchester

[11] Patent Number: 6,006,888
[45] Date of Patent: Dec. 28, 1999

[54] DOUBLE SPIRAL CONVEYOR

[76] Inventor: Donald M. Winchester, 5269 County Rd. 281, Kaufman, Tex. 75142-5124

[21] Appl. No.: 08/890,064

[22] Filed: Jul. 9, 1997

[51] Int. Cl.⁶ .................................................. B65G 11/06
[52] U.S. Cl. .............................................................. 193/12
[58] Field of Search ........................................ 193/12, 13

[56] References Cited

U.S. PATENT DOCUMENTS

| | | | |
|---|---|---|---|
| 728,626 | 5/1903 | Schwab | 193/12 |
| 826,613 | 7/1906 | Schwab | 193/12 |
| 1,250,777 | 12/1917 | Bernheim | 193/13 |
| 1,250,778 | 12/1917 | Bernheim | 193/13 |
| 3,278,054 | 10/1966 | Stott | 414/299 |
| 3,565,226 | 2/1971 | Winchester | 193/12 |
| 3,566,501 | 3/1971 | Winchester | 29/889 |
| 4,790,355 | 12/1988 | Kennedy | 138/37 |

FOREIGN PATENT DOCUMENTS

| | | | |
|---|---|---|---|
| 1370043 | 7/1964 | France | 193/12 |
| 3720093 | 4/1988 | Germany | 193/12 |
| 140732 | 11/1960 | U.S.S.R. | 193/12 |
| 970136 | 9/1964 | United Kingdom | 193/12 |

OTHER PUBLICATIONS

*Haslett Sprial Chutes*, Product Brochure, Haslett Chute and Conveyor Company, May 1953, 4 pgs.

*Primary Examiner*—Andrew C. Pike
*Attorney, Agent, or Firm*—Michael A. O'Neil

[57] ABSTRACT

A double spiral conveyor includes two spiral chutes, each chute being positioned diametrically opposite the other in a helical relationship about a central axis of a central tubular support. The spiral chutes begin in the same upper horizontal plane and terminate in the same lower horizontal plane. The spiral conveyor further includes a rotatable discharge pan that receives the transported product as it is discharged from the two spiral chutes and directs the product to a predetermined location.

2 Claims, 5 Drawing Sheets

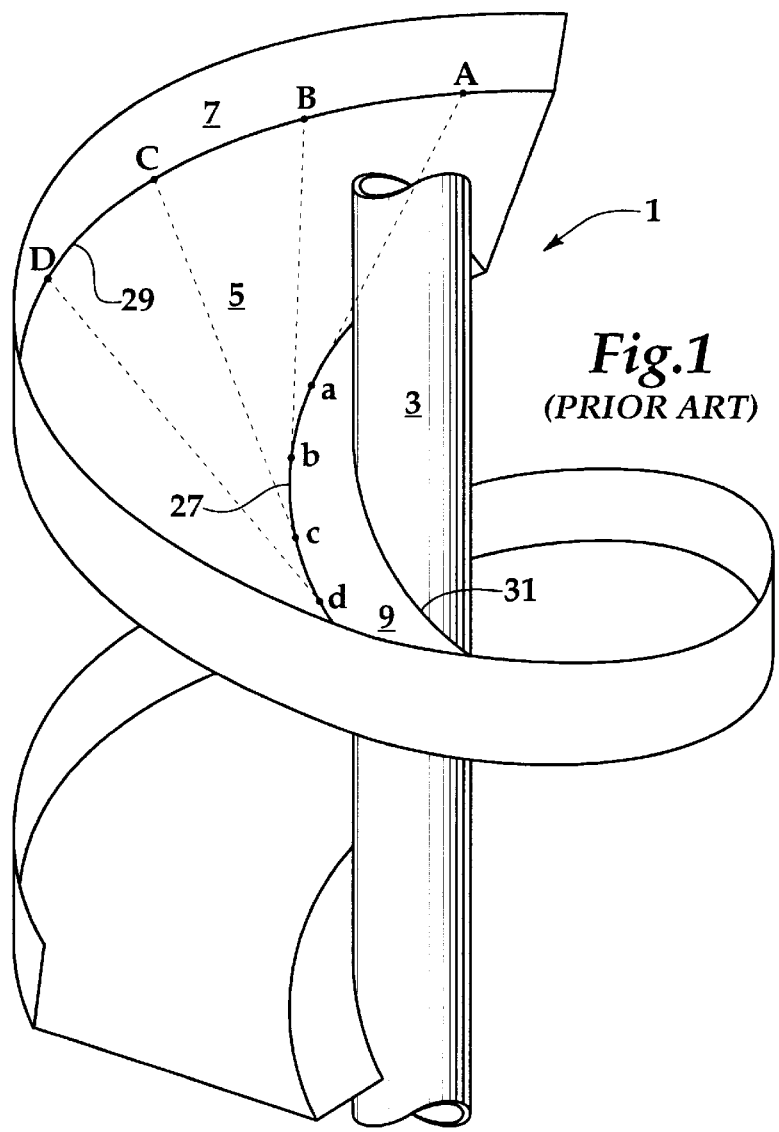
Fig.1
*(PRIOR ART)*
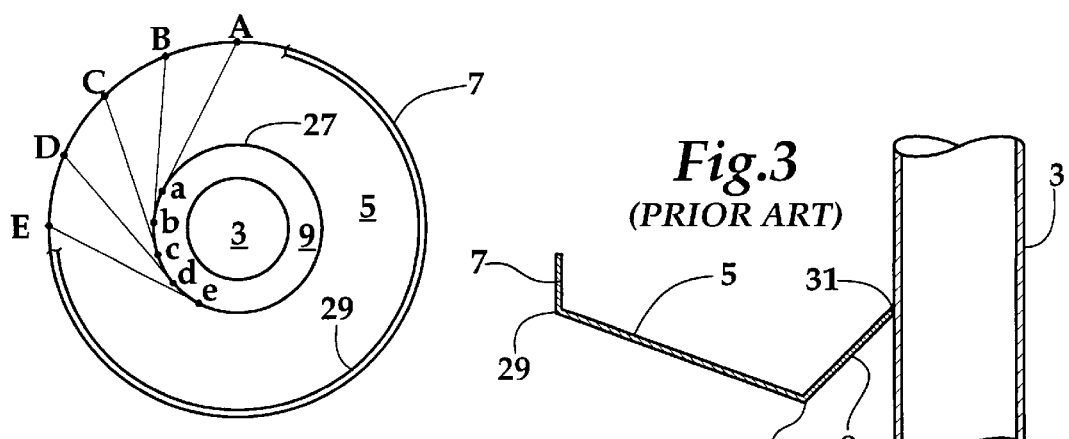
Fig.3
*(PRIOR ART)*
Fig.2
*(PRIOR ART)*

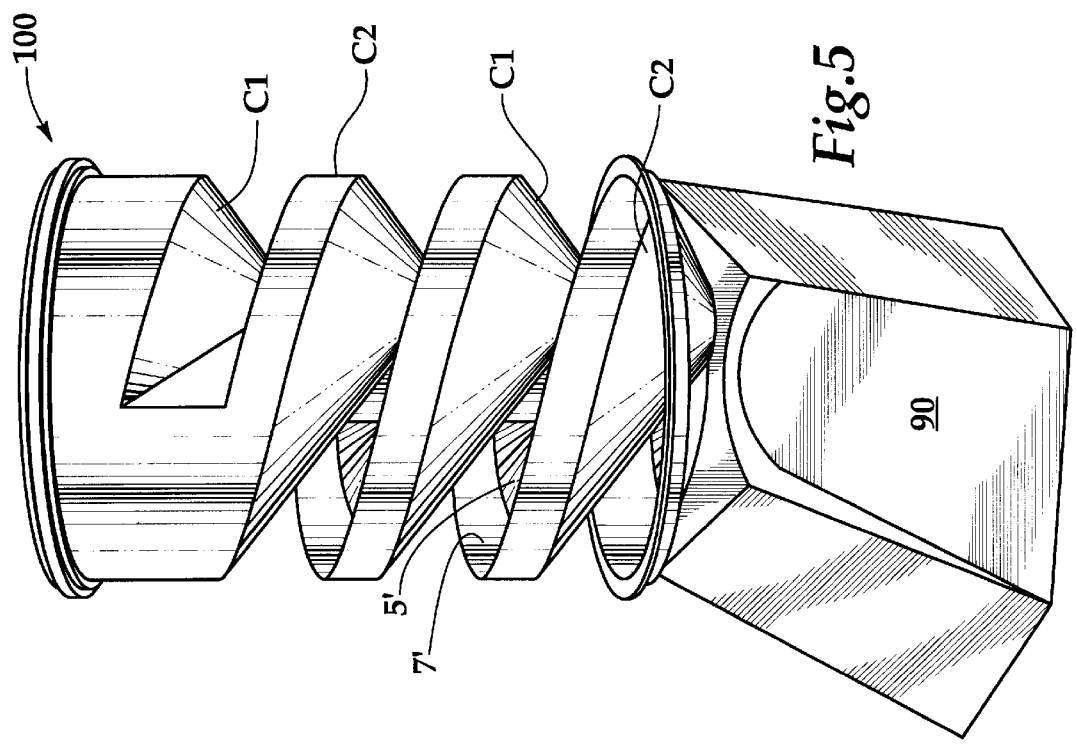
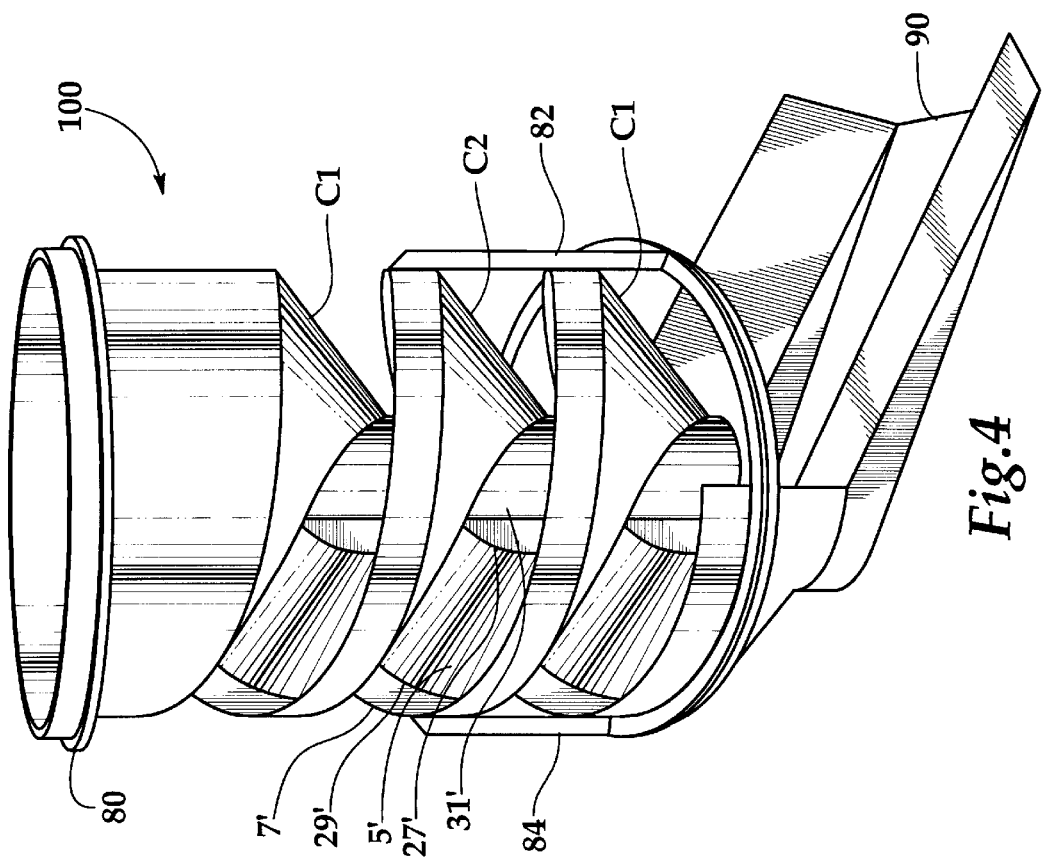

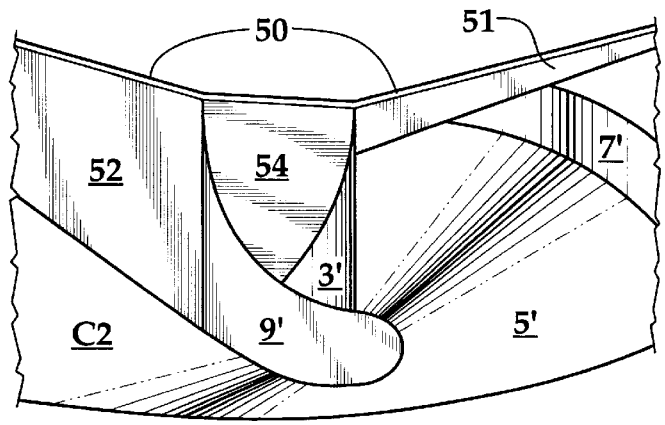
Fig.9
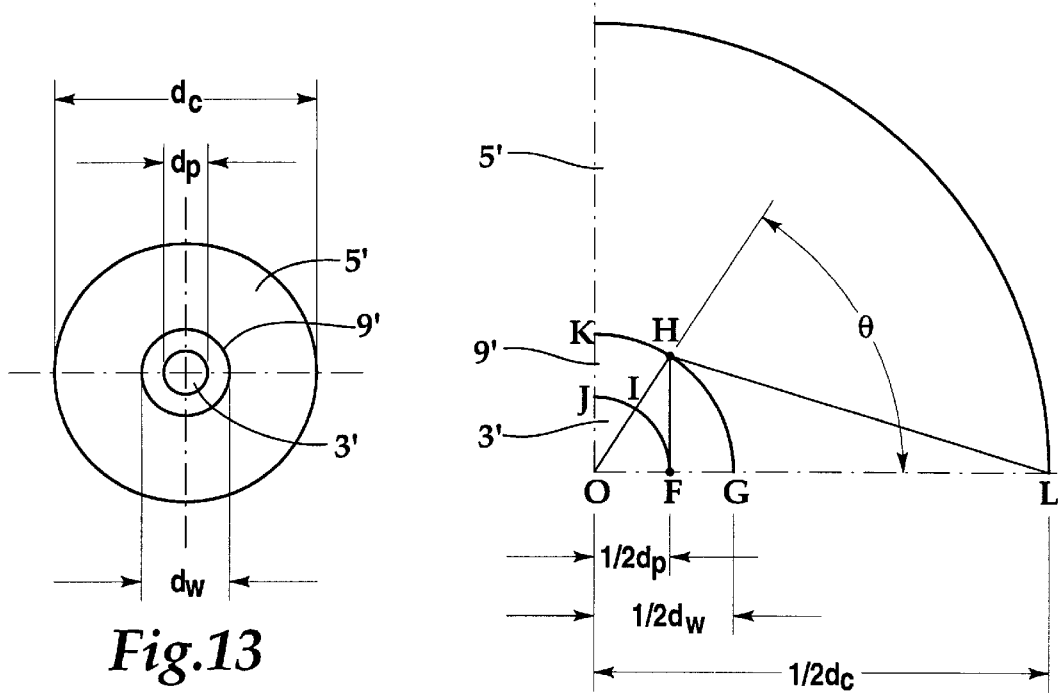
Fig.13
Fig.14
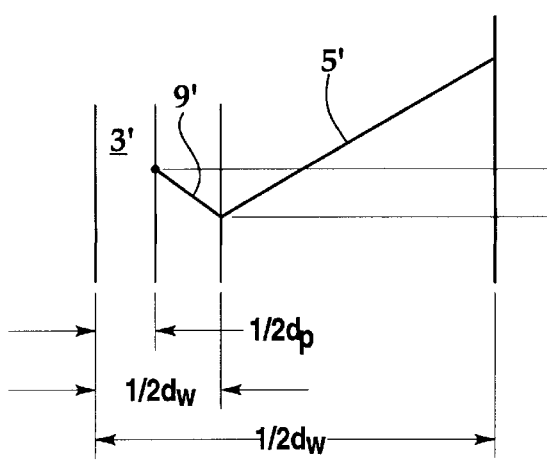
Fig.15
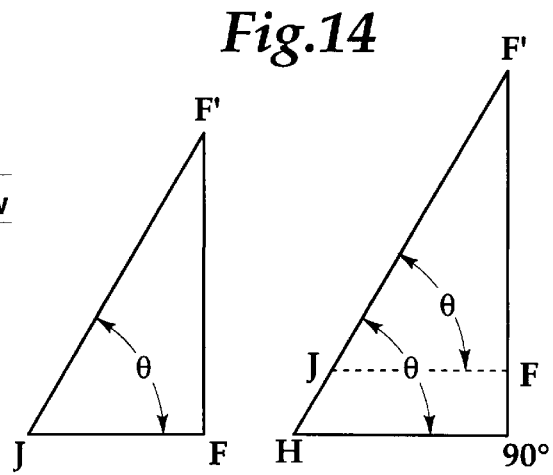
Fig.16
Fig.17

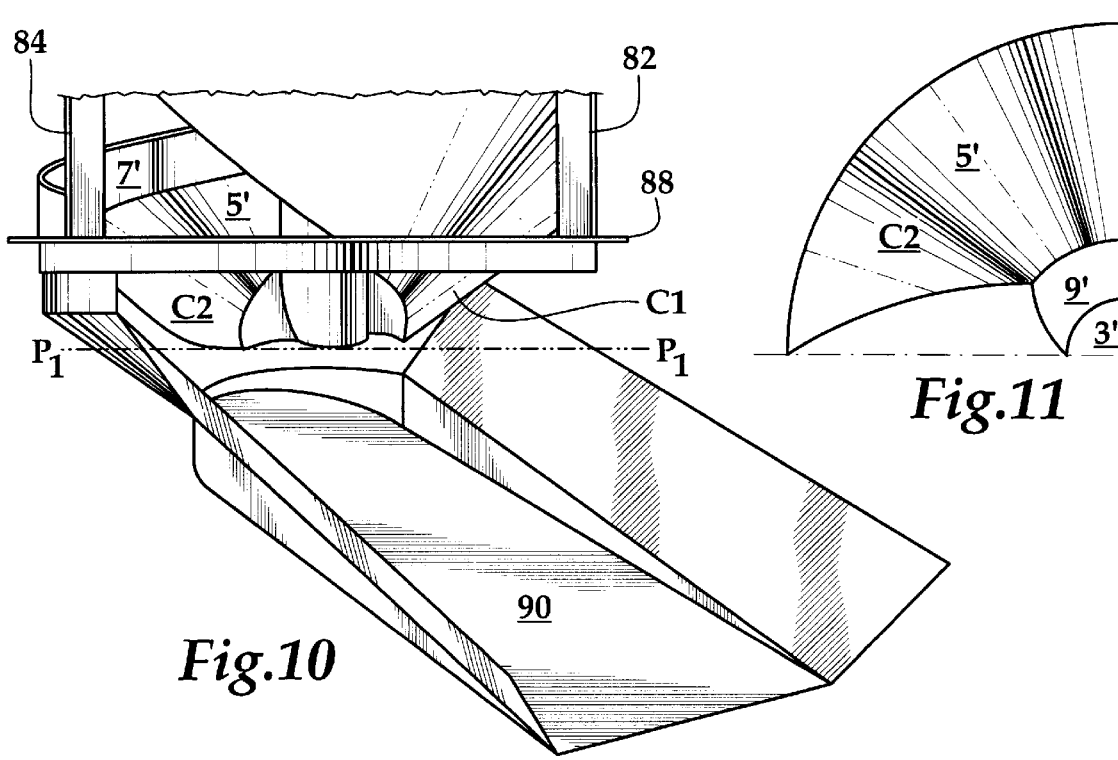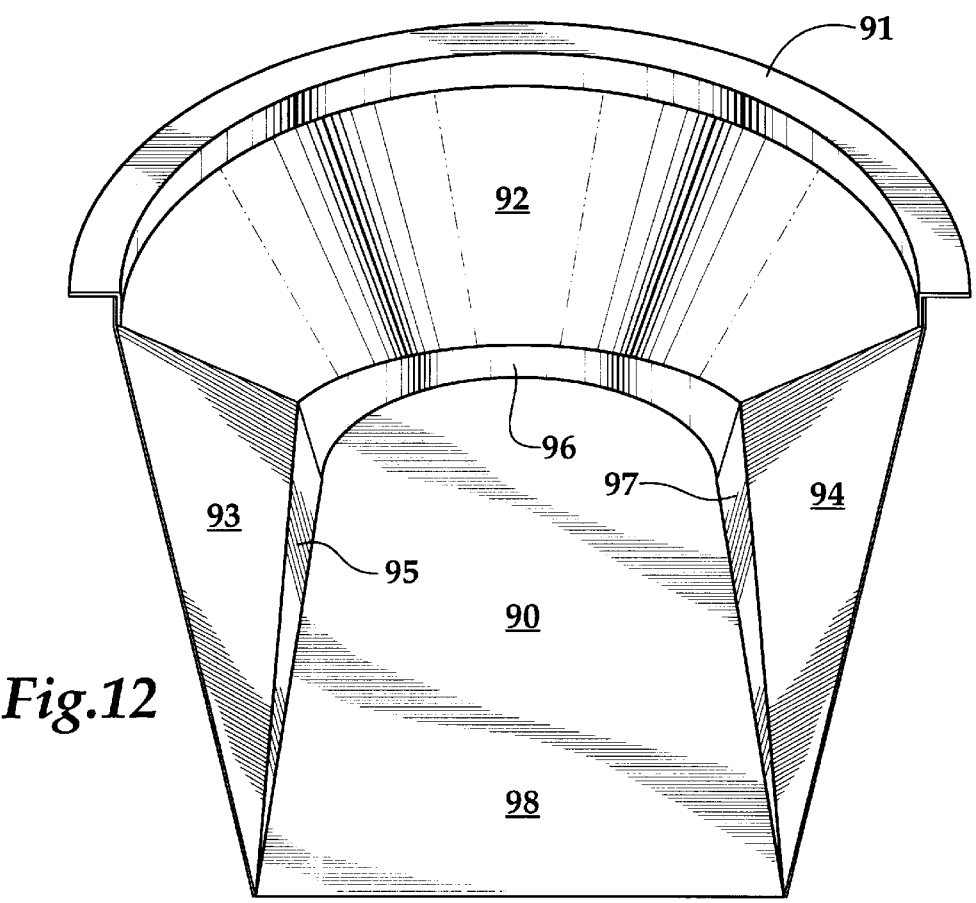

DOUBLE SPIRAL CONVEYOR

TECHNICAL FIELD

The present invention relates generally to spiral conveyors for vertical transfer of food products, and more particularly to a double spiral conveyor for vertical transfer of food products in a restricted vertical space.

BACKGROUND AND SUMMARY OF THE INVENTION

Single and double spiral chutes for transfer of coal, packages, food products, etc., are known in the prior art. Indeed, the inventor of the present invention, Donald M. Winchester, has received U.S. Pat. Nos. 3,565,226 and 3,566,501 for single spiral chutes, the disclosures of which are incorporated herein by reference. Double spiral chutes for transferring coal and packages are disclosed in U.S. Pat. Nos. 826,613 and 728,626; and in Great Britain Patent No. 970,136.

The present invention is specially designed for the vertical transportation of breakable food products such as potato chips, corn chips, pretzels, and the like. Such food products are susceptible to breakage if they are dropped from one processing station to another. The use of spiral conveyors has been found to be desirable for preventing breakage as such products are transported vertically from one processing station to another.

The present invention is an improvement over the prior art single spiral conveyors of Winchester disclosed in U.S. Pat. Nos. 3,565,226 and 3,566,501. In food processing facilities logistical constraints may dictate that a certain volume of product must be moved vertically from one processing station to another. In some instances the vertical distance between the processing stations is constrained such that a single spiral conveyor will not handle the desired throughput volume. The present invention substantially increases the throughput volume over that of a single spiral conveyor while minimizing product breakage and preventing clogging of the conveyor. The spiral conveyor of the present invention is characterized by a lack of buckling and distortion of the sliding surface and is fabricated without twisting the flat metal sheets used in its construction.

The present invention comprises two spiral chutes beginning in the same horizontal plane, each of the chutes having an inner wall attached to a central tubular support in a helical relationship. A slide attaches along the outer edge of the inner wall and an outer wall is attached along the outer edge of the slide. The double spiral chutes terminate in the same horizontal plane. The double spiral conveyor further includes a positionable discharge pan that receives the product as it is discharged from the two spiral chutes and directs the product as desired.

BRIEF DESCRIPTION OF THE DRAWINGS

A more complete understanding of the present invention may be had by reference to the following Detailed Description when taken in connection with the accompanying Drawings wherein:

FIG. 1 is a perspective view of a single spiral conveyor of the prior art;

FIG. 2 is a plan view of the prior art single spiral conveyor illustrating a manner of establishing tangent points on the inner and outer edges of the slide for purposes of manufacture;

FIG. 3 is a section view of the prior art single spiral conveyor taken through and parallel to the vertical axis of the conveyor of FIG. 1;

FIG. 4 is a perspective view looking down on the double spiral conveyor of the present invention;

FIG. 5 is a perspective view looking up on the double spiral conveyor of the present invention;

FIG. 9 is an enlarged partial perspective view illustrating a first adapter plate useful for beginning both spiral chutes in the same horizontal plane;

FIG. 10 is a partial side view of the double spiral conveyor of the present invention illustrating the spiral chutes terminating in the same horizontal plane and illustrating the positionable discharge pan;

FIG. 11 is an enlarged partial top view illustrating a cutaway portion of the bottom of one of the spiral chutes;

FIG. 12 is a top view of the discharge pan of the present invention; and

FIG. 13 is a first illustration of the mathematical relationships used to calculate dimensions for the preferred embodiment;

FIG. 14 is a second illustration of the mathematical relationships used to calculate dimensions for the preferred embodiment;

FIG. 15 is a third illustration of the mathematical relationship used to calculate dimensions for the preferred embodiment;

FIG. 16 is a fourth illustration of the mathematical relationship used to calculate dimensions for the preferred embodiment; and FIG. 17 is a fifth illustration of the mathematical relationship used to calculate dimensions for the preferred embodiment.

DETAILED DESCRIPTION

Figure 6:
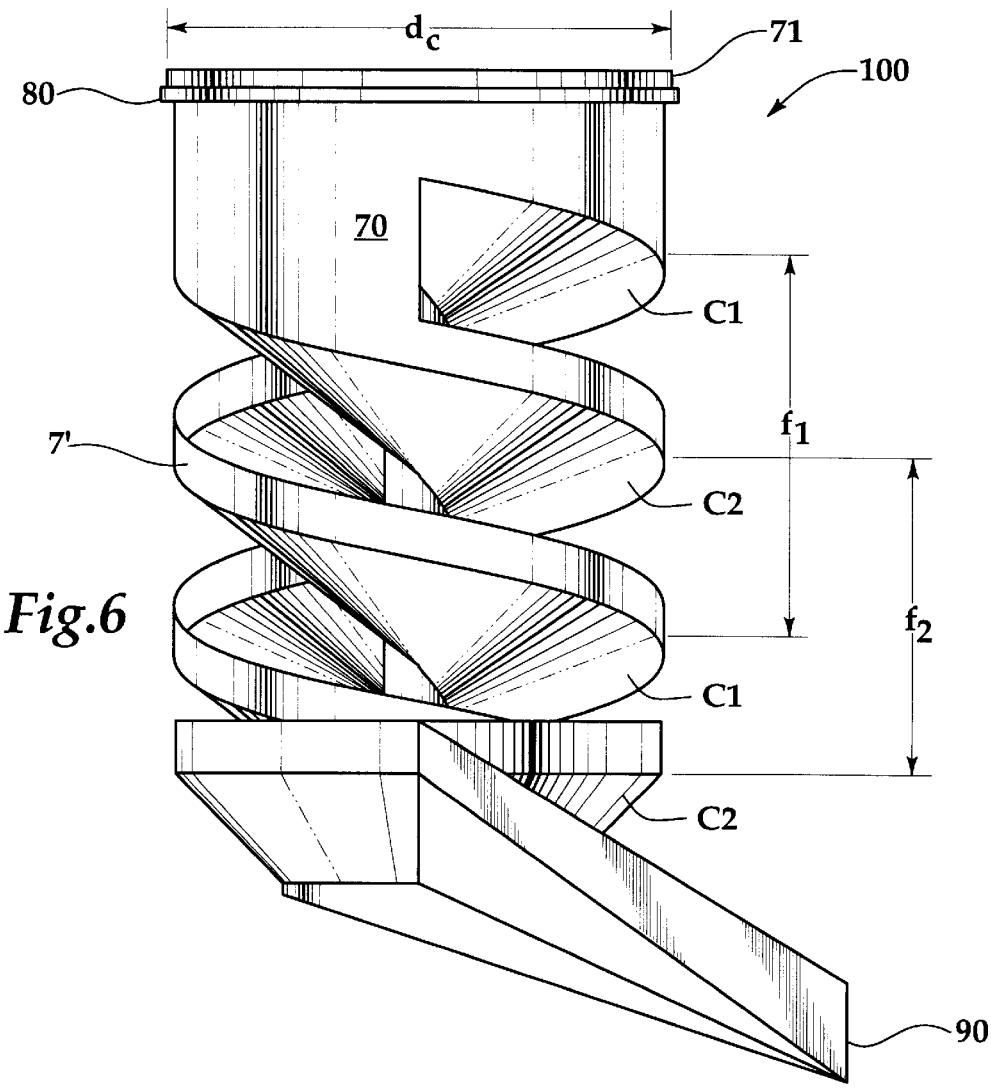
FIG. 6 is a side view of the double spiral conveyor of the present invention.

Reference is now made to the Drawings wherein like reference characters denote like or similar parts throughout the FIGURES. Referring to FIG. 1, a prior art single spiral conveyor 1 by Winchester comprises a center pole 3, slide 5, inner wall 9, and outer wall 7. The center pole 3 extends vertically as shown and may be supported in numerous ways. For the same angular displacement around axis 13, a point on the inner edge 27 of the slide 5 must descend the same vertical distance as a point on the outer edge 29 of the slide 5 but will travel a lesser total distance (being closer to the axis 13 or center of rotation in its descent). Thus, the inner edge 27 of the slide descends at a greater rate than the outer edge 29.

FIG. 2 is a plan view of the spiral chute of FIG. 1. The letters A to E are points on the outer edge 29 of the slide 5 and the letters a to e are points on the inner edge 27. The line a-A is established as the starting line, (this line being tangent to the inner edge 27 of the slide 5) and the relative locations of the terminal points of the similarly tangential lines b-B, c-C, d-D, and e-E are established.

The flat shape of slide 5 is then cut out and passed through a slip roller so that lines a-A, b-B, c-C, d-D, and all lines tangent to the inner edge of slide 5 are substantially parallel to the rollers. In this way, the continuous bend imparted to the sheet by the roller proceeds around the scribed lines and all lines tangent to the inner edge 27, scribed or imaginary. This requires manipulation of the sheet as it passes through the roller so that the longer outer edge 29 is moved through more rapidly than the shorter inner edge 27. Although the sheet can, of course, be rolled in this manner without the visual aid of lines a-A, b-B, etc., it has been found advantageous to scribe these lines on the flat sheet during the triangulation process so that they can be used as reference lines during the rolling.

The spiral chute of FIG. 1 is completed by fabrication of the inner wall 9 and outer wall 7, and their assembly to the slide 5 and the center pole 3. The inner wall 9 is fabricated similarly to the slide 5 except that in this case the tangential lines are scribed tangent to the circle representing the inner edge of the inner wall 9, which is equal to the diameter of the center pole 3. The outer wall 7 is strip cut to the height desired and assembly of the chute is then accomplished by seam welding the inner wall 9 to the center pole 3, then slide 5 to the inner edge 27, and the outer wall 7 to the slide 5 along edge 31, 27, and 29, respectively. As each section of the slide has been rolled along lines tangent to the inner edge, these lines are straight and can be easily matched and butt welded.

Slide 5 is inclined downwardly toward the center pole 3 to offset the effect of the outward thrust of centrifugal force on the sliding product as it slides down the chute. Without such inclination the product will tend to hug the outer wall 7 and slow to a stop. If the slide 5 directly adjoins the center pole 3, as is common in some other prior art designs, the product tends to strike or catch on the center pole 3 thus impeding its movement. To avoid the above problems, inner wall 9 is interposed between the slide 5 and the center pole 3 and then inclined with respect to the slide 5 to form a v-shaped section as shown in FIG. 3.

Referring now to FIGS. 4 and 5, there is illustrated the double spiral conveyor 100 of the present invention. The double spiral conveyor 100 includes numerous component parts which are substantially identical to construction and function to component parts of the prior art conveyor illustrated in FIGS. 1, 2, and 3 and described hereinabove in conjunction therewith. Such identical component parts are designated in FIGS. 4 and 5 with the same reference numerals utilized above in the description of the prior art spiral conveyor, but are differentiated therefrom by means of a prime (') designation. In particular, the parts 3', 5', 7', 9', 27', 29', and 31' correspond to parts 3, 5, 7, 9, 27, 29, and 31 as described hereinbefore.

The double spiral conveyor 100 includes two spiral chutes, C1 and C2, each beginning in the same horizontal plane (See FIGS. 7 and 8), each of the chutes having an inner wall 9'0 attached to a central tubular support 3' in a helical relationship. A slide 5' attaches along the outer edge of the inner wall and an outer wall 7' is attached along the outer edge of the slide 5'. The double spiral chutes C1 and C2 terminate in the same horizontal plane (see FIG. 10). The spiral conveyor 100 further includes a positionable discharge pan 90 that receives the product as it is discharged from the two spiral chutes C1 and C2 and directs the product to a desired location.

Referring now to FIG. 6, therein is illustrated a preferred embodiment of the present invention used for potato chips wherein the flight spacing f1 of the chute C1 is equal to the diameter $d_c$ of the spiral conveyer 100. Likewise, the flight spacing f2 of chute C2 is equal to the diameter $d_c$. It will be understood by those skilled in the art that for more dense products such as corn chips or pretzels, the distances f1 and f2 will be equal to each other but may be less than the diameter $d_c$ of the spiral conveyor 100.

In the upper portion of the spiral conveyor 100, the outer wall 7' of each spiral chute C1 and C2 is extended into a continuous tubular sidewall 70 that extends to the top edge 71 of the conveyor. The continuous sidewall contains and deflects product back into the spiral chutes C1 and C2 that otherwise might be deflected from the spiral conveyor by the action of the product members striking themselves or bouncing off the conveyor members.

The spiral conveyor 100 of the present invention is illustrated as being terminated in flange 80. It will be understood by those skilled in the art that the conveyor may be terminated in any manner suitable for mounting below the discharge of the processing station positioned above. As illustrated in FIG. 4, the spiral conveyor 100 includes spacer supports 82 and 84 for structural rigidity.

Figure 7:
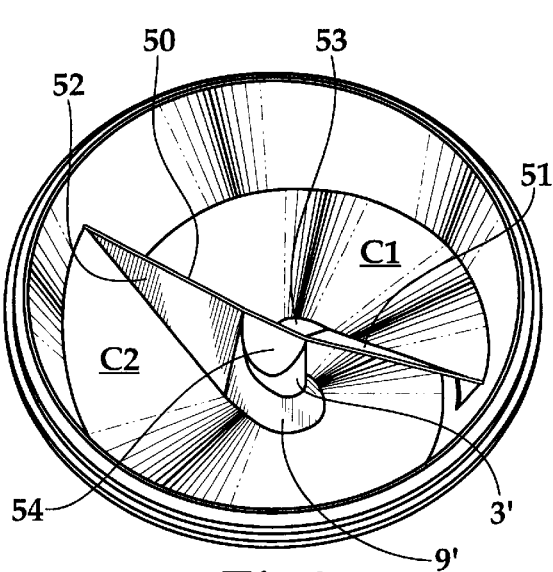
FIG. 7 is a partial perspective view of the double spiral conveyor of the present invention illustrating both spiral chutes beginning in the same horizontal plane.
Figure 8:
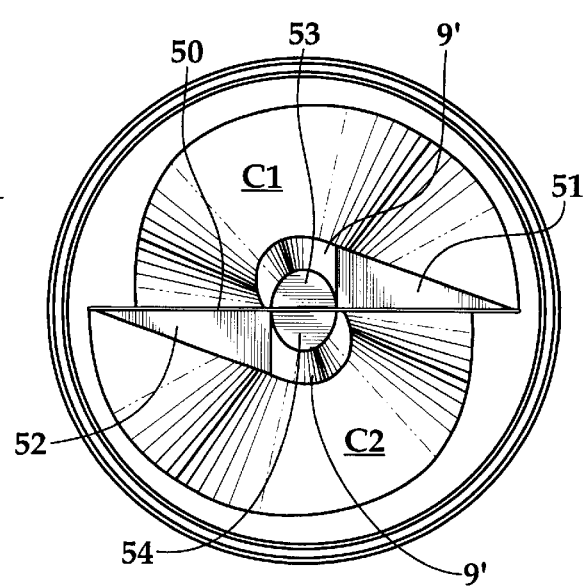
FIG. 8 is a top view of the double spiral conveyor of the present invention illustrating both spiral chutes beginning in the same horizontal plane.

Referring now to FIGS. 7, 8, and 9 therein is illustrated another important feature of the present invention. The spiral chute C1 and the spiral chute C2 both begin in the same horizontal plane as ridge 50. Ridge 50 includes a curved top of approximately a 0.25 inch radius, as opposed to a blunt or knife edge top, to prevent damage to the falling product. A triangular adapter plate 51 transitions from the edge of slide 5' of spiral chute C1, and the termination of inner wall 9', to ridge 50. Likewise, a triangular adapter plate 52 transitions from the edge slide 5' of spiral chute C2, and the termination of inner wall 9', to ridge 50. The triangular adapter plates 51 and 52 prevent product breakage as the product is discharged from above and assists in preventing product blockage of the upper end of the chutes C1 and C2 of the conveyor 100.

Central tubular support 3' is closed with a pair of half-ellipsoid shaped closure plates 53 and 54. The closure plates 53 and 54 are positioned at approximately 60° degrees from horizontal to prevent product from accumulating and to prevent product breakage.

Referring to FIGS. 10, 11, and 12 therein is illustrated the discharge end of the spiral conveyor 100 of the present invention which comprises another important feature of the present invention. The spiral chute C1 and the spiral chute C2 both terminate the horizontal plane P1, thereby allowing the product to fall approximately the same distance from either chute C1 or C2 to the discharge pan 90.

Referring to FIG. 11 therein is illustrated another distinguishing feature of the present invention. The slide 5' of chutes C1 and C2 are not terminated in a straight edge perpendicular to the center axis of the central tubular support 3'. It has been determined that by cutting the slide 5' back at an angle to the perpendicular, the increased size of the opening to discharge pan 90 increases the throughput volume of the spiral conveyor 100.

Referring again to FIG. 10, the spiral conveyor 100 includes a circular mounting flange 88 formed from angle iron. The mounting flange 88 is secured to the supports 82 and 84. Turning now to FIG. 11, therein is illustrated a plan view of the discharge pan 90. The pan 90 includes a circular mounting flange 91 that is movably positioned on top of the mounting flange 88 allowing the pan 90 to be selectively positioned. The pan 90 further includes a semicircular back 92 that is connected to the circular mounting flange 91. A right side wing 94 and a left side wing 93 are attached at their proximal ends to the circular back 92. A flat bottom 98 is connected to the back 92 and wings 93 and 94 by transition pieces 95, 96, and 97. The pan 90 is open on its distal end and the bottom 98 of the pan 90 is sloped downwardly and away from the back 92. The bottom 98 of the pan 90 has a predetermined slope depending upon the density of the product to be conveyed. For potato chips the slope is about 20 degrees upwardly from horizontal.

In the preferred embodiment of the present invention, the spiral chutes C1 and C2 and discharge pan 90 are fabricated from stainless steel for sanitation, strength, and durability. However, it will be understood by those skilled in the art that other materials suitable for food processing equipment may be used in the fabrication of the present invention.

In operation, a food product such as potato chips is discharged through a gate from a processing station positioned above ridge 50 of the dual spiral conveyor 100. The chips distribute themselves into chutes C1 and C2 and, driven by momentum and force of gravity, pass down chutes C1 and C2 on slides 5' to the bottom of the chutes C1 and C2 wherein they are received by discharge pan 90. The open distal end of discharge pan 90 is positioned to direct the food product to the next processing station.

Referring now to FIGS. 13 through 17, therein is illustrated drawings useful in performing the algebraic and trigonometric calculations used in fabricating the preferred embodiment of the present invention. Referring to FIG. 12A, there is illustrated a horizontal projection of the one flight of the chute C1. The chute C2 is similarly configured and fabricated. The diameter $d_c$ of chute C1 equals the diameter $d_c$ of C2 and is selected to be equal to 16 inches. The diameter of the center pole $d_p$ is selected to be 2.5 inches and the diameter $d_w$ of the inner wall section 9' is selected to be 5 inches.

Referring to FIG. 14, which is an enlarged portion of FIG. 12A, the given distance OF is ½ $d_p$=1.25 inches. The given distance OH is ½ $d_w$=2.5 inches. The angle theta of 60° is trigonometrically calculated from the known dimensions OF=1.25 and OH=2.5. The distance FL is determined algebraically as the difference between the distance OL and the distance OF (8−1.25)=6.75 inches. The distance FH=2.165 is also determined trigonometrically from the cosine of theta and the known distance OH.

As noted earlier, in the preferred embodiment the distance between a full flight of the chute C1 is equal to the diameter of the conveyor $d_c$. Therefore, the drop for ¼ of the chute C1 along the arc GK is ¼ of 16 inches=4 inches. Likewise the drop along the arc FJ is also 4 inches. The drop along arc GH is calculated from the proportional relationship that arc GH is 60°÷90°×4 inches=2.67 inches. The length of the horizontal projection of the arc GK is calculated as ¼ Pi×$d_w$= 3.927 inches.

Referring to FIGS. 16 and 17 therein is illustrated additional trigonometric relationships useful in fabricating the present invention. For the same angular displacement (90°) around the central tubular support 3, a point F on the inner edge of the slide 5' must descend the same vertical distance F' as a point on the outer edge of the slide 5' but will travel a lesser total distance (being closer to the axis or center of rotation in its descent). Thus, the inner edge of the slide 5' descends at a greater rate than the outer edge. However, a line HF tangent to the inner wall falls at the same angle Theta.

Referring to FIG. 16, the length of the horizontal projection of arc JF is calculated as ¼×Pi×$d_w$=¼×3.1416×2.5= 1.963. FF' is the vertical distance the arc line JF falls in 90° degrees which is fixed at 4 inches (¼ of 16 inches for a full flight). Therefore, the angle Theta is the rate at which the inner wall is falling. Theta=the arc tangent of FF'÷JF=arc tangent of 4/1.963=63.85°. Referring to FIG. 12E with the known angle of descent of Theta=63.85° and the previously calculated distance of 2.165 for HF, the vertical fall FF' can be calculated as 4.412 inches.

Referring to FIG. 15, $d_v$, the depth of the "V", may be determined by subtracting the vertical fall along arc GF previously calculated as 2.67 inches from the vertical fall FF' of 4.412 inches=1.744 inches.

Although preferred embodiments of the present invention has been illustrated in the accompanying Drawings and described in the foregoing Detailed Description, it will be understood that the invention is not limited to the embodiments disclosed but is capable of numerous rearrangements, modifications, and substitutions of parts and elements without departing from the spirit of the invention.

I claim:

1. A double spiral conveyor for conveying bagged food products downwardly from an upper horizontal plane to a lower horizontal plane comprising;

a vertical tubular center support; and two independent spiral chutes for simultaneously receiving the bagged food products at the upper horizontal plane and for transporting said bagged food products downwardly under the action of gravity to the lower horizontal plane, the chutes being positioned diametrically opposite one another about a central axis of the center support, each spiral chute having an inner wall including an inner edge and an outer edge and being attached to the center support at said inner edge, a slide including an inner edge attached to the outer edge of the inner wall and an outer edge, and an outer wall including an inner edge attached to the outer edge of the slide; and a discharge pan positioned under the lower horizontal plane for simultaneously receiving said bagged food products from both spiral chutes.

2. A double spiral conveyor comprising:

a vertical tubular center support; and two independent spiral chutes, each chute beginning in the same upper horizontal plane and terminating in the same lower horizontal plane, each chute being positioned diametrically opposite the other in a helical relationship about a central axis of the center support, each spiral chute having:

an inner wall having an inner edge and an outer edge and being attached to the center support at said inner edge;

a slide having an inner edge attached to the outer edge of the inner wall and an outer edge; and an outer wall having an inner edge attached to the outer edge of the slide and an outer edge;

wherein the inner wall is disposed downwardly with respect to a third horizontal plane passing through the central axis of the center support, and the slide is disposed upwardly with respect to said third horizontal plane, thereby forming a v-shaped section;

wherein the two spiral chutes simultaneously receive bagged food products at the upper horizontal plane for downward transport to said lower horizontal plane;

said double spiral conveyor further including a discharge pan positioned under the lower horizontal plane for simultaneously receiving the bagged food products from both chutes.

* * * * *